(12) United States Patent
Jones

(10) Patent No.: US 6,931,007 B2
(45) Date of Patent: Aug. 16, 2005

(54) SYSTEM AND METHOD OF SERVING DATA MESSAGES

(75) Inventor: Clifton T. Jones, Garner, NC (US)

(73) Assignee: Longboard, Inc., Santa Clara, CA (US)

( * ) Notice: Subject to any disclaimer, the term of this patent is extended or adjusted under 35 U.S.C. 154(b) by 923 days.

(21) Appl. No.: 09/915,016

(22) Filed: Jul. 25, 2001

(65) Prior Publication Data

US 2003/0021290 A1 Jan. 30, 2003

(51) Int. Cl.[7] ............................................. H04L 12/56
(52) U.S. Cl. ....................... 370/392; 370/259; 370/466; 379/142.04; 455/466; 455/414.1
(58) Field of Search ................. 379/142.01–142.18, 379/245–249, 207.13, 207.15, 88.17, 93.01–93.04; 455/414.1, 414.4, 415, 466; 370/259, 389, 392, 401, 466, 522

(56) References Cited

U.S. PATENT DOCUMENTS

| | | | | |
|---|---|---|---|---|
| 5,696,815 A | * | 12/1997 | Smyk | 379/142.16 |
| 5,724,412 A | * | 3/1998 | Srinivasan | 379/93.23 |
| 6,421,427 B1 | * | 7/2002 | Hill et al. | 379/88.14 |
| 6,687,245 B2 | * | 2/2004 | Fangman et al. | 370/356 |
| 6,700,972 B1 | * | 3/2004 | McHugh et al. | 379/265.13 |
| 6,757,732 B1 | * | 6/2004 | Sollee et al. | 709/227 |
| 6,831,969 B2 | * | 12/2004 | Ju | 379/142.16 |

* cited by examiner

*Primary Examiner*—Bob Phunkulh
*Assistant Examiner*—Joshua Kading
(74) *Attorney, Agent, or Firm*—Pillsbury Winthrop Shaw Pittman LLP

(57) ABSTRACT

A system and method of serving text-based data messages to a caller identification (caller ID) system in a telecommunications network environment may overwrite source-specific information in a selected data packet header field with text-based message data. A protocol translator may enable text data to be served to a caller ID system used in conjunction with a plain old telephone service (POTS) telephone as well as with a Session Initiation Protocol (SIP) device. Text messages addressed and routed to a caller ID enabled device may be displayed on the caller ID display.

28 Claims, 5 Drawing Sheets

SYSTEM AND METHOD OF SERVING DATA MESSAGES

BACKGROUND

1. Field of the Invention

Aspects of the present invention relate generally to delivering data messages in a communications network, and more particularly to a system and method of serving text-based data messages to a caller identification system in a telecommunications system.

2. Description of the Related Art

Conventional caller identification (caller ID) systems employ an alphanumeric display or other monitor to display the telephone number of the source from which an incoming telephone call has originated; additionally, some such systems are adapted to display a name or other identifying string of alphanumeric characters associated with the telephone number. Though some caller ID systems support such name identification, association of identifying text with the telephone number identification feature is more typically enabled at the device receiving the telephone call.

Even the most sophisticated conventional caller ID systems are not capable of receiving text-based messages transmitted from a remote device, nor are such systems capable of displaying such messages. There has been a continuing and growing need for a system and method of delivering text-based data messages to a caller ID system employing existing protocols and equipment.

DETAILED DESCRIPTION

Embodiments of the present invention overcome various shortcomings of conventional technology, providing a system and method of serving text-based data messages to a caller identification (caller ID) system.

In accordance with some aspects of the present invention, computer server hardware or software may be employed to overwrite source-specific information in a selected data packet header field ordinarily reserved for identifying the source of the data packet; text-based message data may replace the source-specific information. A protocol translator may enable text data to be served to a caller ID system used in conjunction with a plain old telephone service (POTS) telephone as well as with a Session Initiation Protocol (SIP) device. Text messages addressed and routed to a caller ID enabled device may be displayed on the caller ID display.

The foregoing and other attendant aspects of various embodiments of the present invention will be apparent upon examination of the following detailed description thereof in conjunction with the accompanying drawings.

Figure 1:
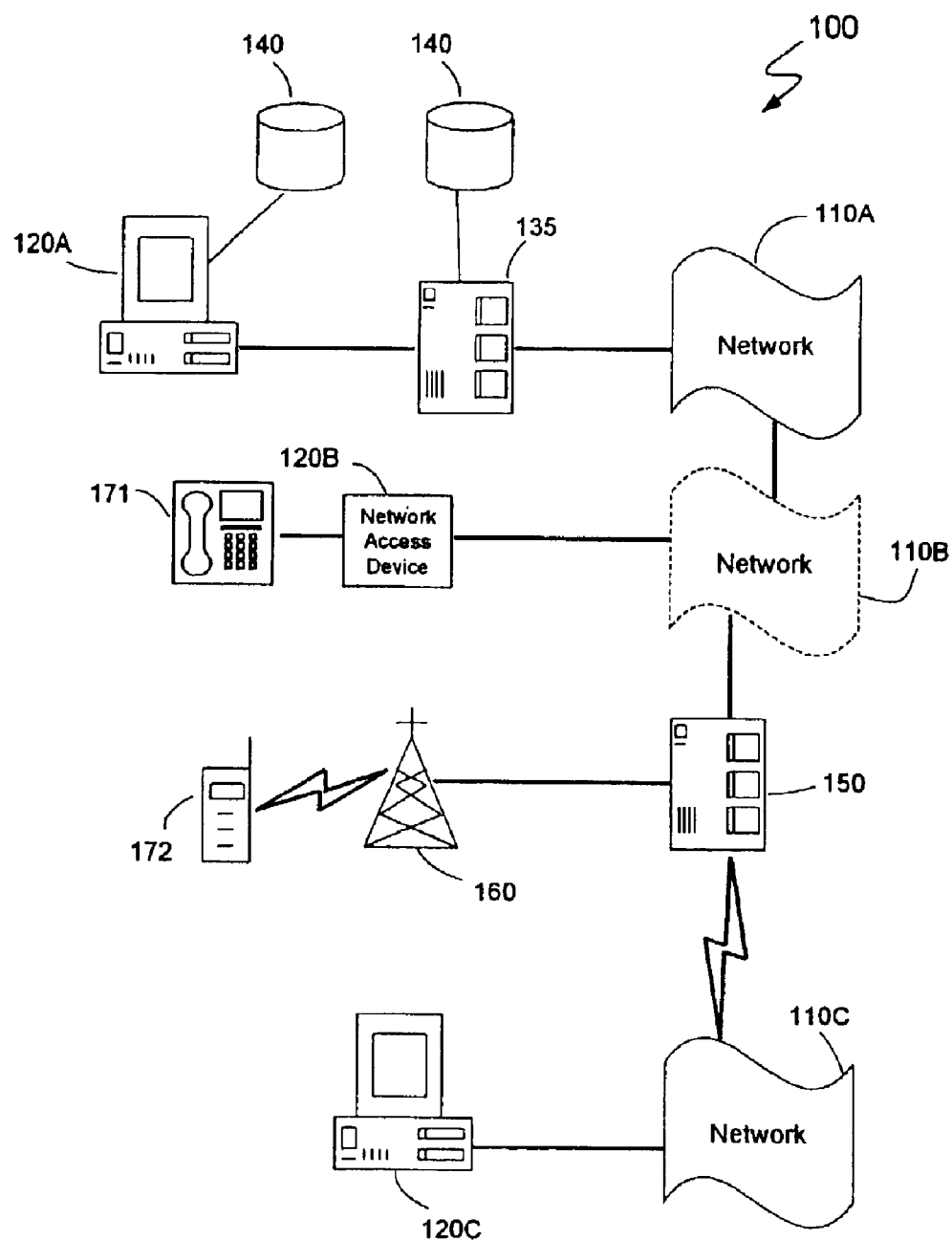
FIG. 1 is a simplified high-level block diagram illustrating a data communication network environment in which an embodiment of a system and method of serving data messages may be employed.

Turning now to the drawings, FIG. 1 is a simplified high-level block diagram illustrating a data communication network environment in which an embodiment of a system and method of serving data messages may be employed. A network system 100 may be configured to facilitate packet-switched data transmission of text, audio, video, Voice over Internet Protocol (VoIP), multimedia, and other data formats known in the art. System 100 may operate in accordance with various networking protocols, such as Transmission Control Protocol (TCP), Internet Protocol (IP), Hypertext Transfer Protocol (HTTP), Simple Mail Transfer Protocol (SMTP), Asynchronous Transfer Mode (ATM), Real-time Transport Protocol (RTP), Real-time Streaming Protocol (RTSP), Session Announcement Protocol (SAP), Session Description Protocol (SDP), and Session Initiation Protocol (SIP). Those of skill in the art will appreciate that a system and method of serving text-based data messages to a caller ID system may be employed in conjunction with numerous other protocols known in the art or developed and operative in accordance with known principles.

Network access devices 120A–120C may be coupled via one or more communications networks 110A–110C enabling data communication between and among network access devices 120A–120C as described in detail below. Additionally, network access devices 120A–120C may be coupled with peripheral devices such as, inter alia, a telephone 171 or wireless telephone 172. Those of skill in the art will appreciate that network access devices 120A–120C and any attendant peripheral devices may be coupled via one or more networks 110A–110C as illustrated in FIG. 1.

For simplicity, data communications such as the foregoing, i.e. involving data transmissions between network access devices 120A–120C, may be discussed in the present disclosure with reference to calls. The term "call," as used herein, may refer to audio transmissions (e.g. voice, digital audio, or telephone signals), video data transmissions, text-based services (e.g. "short message service" (SMS) or "instant text messaging"), multimedia-based message delivery, or any other packet-based data communication as is known in the art.

Calls may be any real-time or near-real-time audio, video, text, or multimedia-based message transmissions across a computer network (i.e. an "on-line" message transmission). Examples of such transmissions include, but are not limited to, user-to-user or user-to-multi-user communications involving electronic conveyance of one or more digital messages such as data packets. Accordingly, examples of calls may include the following: electronic text "chat" or "talk" messaging; electronic mail (e-mail); SMS or instant text messaging; video-conferencing; and internet or other IP-based telephony, which may employ VoIP.

In some embodiments, for instance, network access devices 120A–120C may be personal desktop or laptop computers, workstations, personal digital assistants (PDAs), personal communications systems (PCSs), wireless telephones, or other network-enabled devices. The scope of the present disclosure is not limited by the form or constitution of network access devices 120A–120C; any apparatus known in the art which is capable of data communication on networks 110A–110C is within the scope and contemplation of the inventive system and method.

Each individual network 110A–110C may also include or be coupled, either directly or indirectly, to other networkable devices known in the art in addition to one or more of the following, for example: storage media 140; application server 135; telephone network server 150; and wireless telephone base station 160. It is well understood in the art that any number or variety of computer networkable devices or components may be coupled to networks 110A–110C without inventive faculty. Examples of other devices include, but are not limited to, the following: servers; computers; workstations; terminals; input devices; output devices; printers; plotters; routers; bridges; cameras; sensors; or any other networkable device known in the art.

A network 110A–110C may be any communication network known in the art, including the Internet, a local area network (LAN), a wide area network (WAN), a virtual private network (VPN), or any similarly operating system linking network access devices 120A–120C and similarly capable equipment. Further, networks 110A–110C may be configured in accordance with any topology known in the art such as, for example, star, ring, bus, or any combination thereof. In operation, networks 110A–110C may generally enable unicast and multicast network transactions, i.e. two-way point-to-point, point-to-multipoint, or multipoint-to-multipoint data transfer between and among network access devices 120A–120C.

Application server 135 may be coupled to network 110A which supports receipt and transmission of data packets. Telephone network server 150 may be configured to allow two-way data communication between different networks, such as networks 110B and 110C as depicted in FIG. 1. Additionally or alternatively, telephone network server 150 may communicate with a public-switched telephone network (PSTN), a plain old telephone service (POTS) network, an Integrated Services Digital Network (ISDN), a private branch exchange (PBX) telephone switchboard, or any other telephone network. As illustrated in FIG. 1, telephone network server 150 may be coupled to wireless base station 160, which supports two-way communication between telephone network server 150 and wireless telephone 172.

A system and method of serving text-based data messages to a caller ID system may be implemented, for example, at telephone network server 150 or application server 135. Additionally or alternatively, some or all of the functionality described in detail below may be incorporated into a plurality of distributed servers situated on, or operatively coupled to, one or more of networks 110A–110C.

As noted briefly above, a caller ID system may incorporate a display generally to display the telephone number of the source from which an incoming telephone call has originated. The FIG. 1 network arrangement incorporating an embodiment of a system and method of serving text-based data messages allows a caller ID system coupled to telephone 171 or supported by wireless telephone 172, for example, additionally or alternatively to receive and to display text-based messages (such as may be transmitted via SMS or alphanumeric pager technology).

In some embodiments, a system and method of serving text-based data messages to a caller ID system utilize features of the SIP communication protocol. While the following discussion addresses embodiments employing SIP for simplicity, those of skill in the art will appreciate that the system architecture and functionality set forth below are not limited to SIP implementations.

Figure 2A:
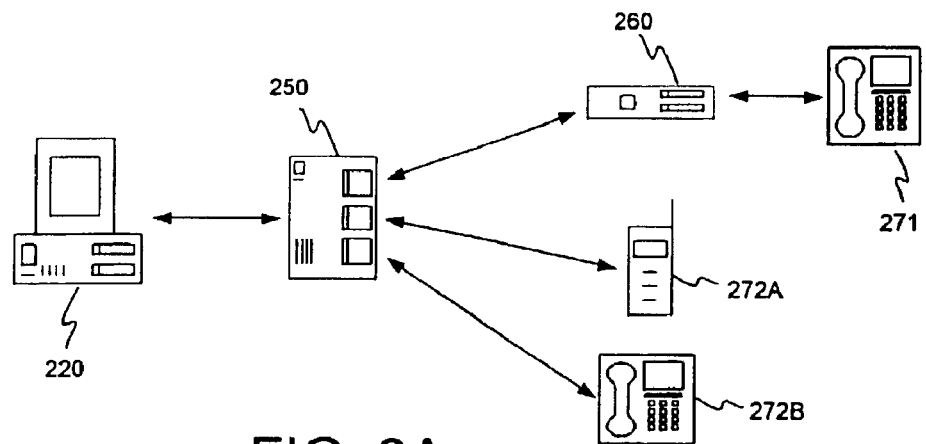
FIGS. 2A and 2B are simplified high-level block diagrams illustrating embodiments of a system serving text-based data messages to a caller identification system.

FIG. 2A is a simplified high-level block diagram illustrating an embodiment of a system serving text-based data messages to a caller identification system. A message source 220, such as a desktop computer or workstation, for example, may generally correspond to an apparatus such as network access devices 120A–120C described above with reference to FIG. 1. Similarly, telephone 271 and wireless telephone 272A may be equivalent to those depicted and described with reference to FIG. 1. Telephone 271 may be an ordinary POTS telephone having caller ID functionality enabled through either an integrated display or a peripheral attachment (not shown). In the following description, both wireless telephone 272A and wire-line telephone 272B are assumed to be SIP enabled; each SIP enabled telephone 272A, 272B implements an integrated caller ID function.

During operation of the FIG. 2A embodiment, a text-based message may be transmitted from message source 220 to POTS telephone 271, SIP enabled telephones 272A, 272B, or some combination thereof, through a message server 250. Message server 250 may generally correspond to telephone network server 150 described above with reference to FIG. 1; accordingly, message server 250 may provide the functionality of telephone network server 150 mentioned above, for example, in addition to serving text-based messages as set forth in detail below. Alternatively, message server 250 or its functionality may be incorporated into a general purpose network device such as application server 135, also described above.

As noted briefly above, POTS telephone 271 and SIP enabled telephones 272A, 272B may support a caller ID feature which enables display of incoming call information on an alphanumeric display. In this regard, SIP enabled telephones 272A, 272B may be capable of packet-switched data communication supporting text-based data transactions in a protocol used by the network (SIP, in this example). The FIG. 2A caller ID enabled POTS telephone 271, however, may be coupled to an Integrated Access Device (IAD) 260. As set forth in detail below, IAD 260 may couple POTS telephone 271 to message server 250, enabling the FIG. 2A embodiment to serve text-based data messages to the caller ID feature of POTS telephone 271.

Message source 220 may be embodied in a combination of hardware, firmware, and software; message source 220 may be capable of executing application program code responsive to user input. Application software (such as a text or chat message application, an e-mail application, or the like) at message source 220 may support composition of a text-based data message, which may be addressed to an IP address representing POTS telephone 271 or SIP telephones 272A, 272B, for example. A text-based message composed and addressed as set forth above may be routed to message server 250, which may queue all such messages for immediate or future delivery.

Message server 250 may ascertain the identity of one or more intended recipients through parsing the header of a message, for example, or through other techniques of routing data packets known in the art; message server 250 may then direct a message accordingly. Text-based SIP messages may be delivered directly to the caller ID feature of SIP enabled telephones 272A, 272B. Text-based SIP messages may be delivered indirectly to POTS telephone 271, through IAD 260.

A system and method of serving text-based data messages to a caller ID system may translate a message from SIP to a protocol recognized or required by POTS telephone 271. In that regard, message server 250 may route a message to IAD 260, which may perform a translation, converting the message to an appropriate protocol for the caller ID feature of POTS telephone 271.

Message server 250 may parse the header of each SIP data packet as described above; in addition to providing IP address information related to each intended recipient, header information in a SIP data packet may also include a "display name" field or "caller ID" field. In accordance with one embodiment, message server 250 may overwrite the contents of the display name or caller ID field in each SIP packet, and replace the contents of such a field with the text-based data message provided by message source 220. Additionally or alternatively, any source-specific data initially present in the display name or caller ID field may be overwritten at message source 220 during creation of the message, such that a text-based data message is originally written directly to the appropriate field in the header of the data packet. In such embodiments, the length of a text-based message which may be served to a caller ID system may be limited by the capacity of the overwritten field in the SIP header.

Upon receipt of a data message at SIP enabled telephones 272A, 272B or at IAD 260, information contained in the display name or caller ID field of the SIP header may be forwarded to the caller ID feature. As described above, since the information contained in a packet header field may be selectively altered (for example, at message source 220, message server 250, or both) to any desired string of characters, a desired text-based message may be delivered through the caller ID feature. Whereas a message may be forwarded directly to the caller ID feature of SIP enabled telephones 272A, 272B, protocol translation may be required at IAD 260 in order to deliver a text-based data message to the caller ID feature of POTS telephone 271.

Figure 2B:
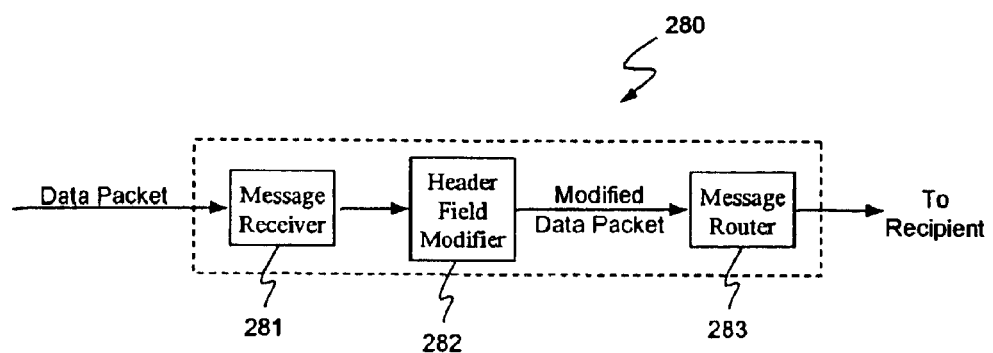

FIG. 2B is a simplified high-level block diagram illustrating an embodiment of a system serving text-based data messages to a caller identification system. As illustrated, a system 280 may generally include at least a message receiver 281, a header field modifier 282, and a message router 283. With reference to components described above, it will be appreciated that system 280 may be implemented, for example, in hardware, firmware, software, or a combination thereof, resident on message server 250; additionally or alternatively, system 280 or components providing equivalent functionality may be resident, in whole or in part, on message source 220 or IAD 260.

Message receiver 281 may be operative to receive a data packet comprising text-based message data and a header field containing source-specific information which may ordinarily identify a source of the data packet; by way of example, such a data packet may be generated at, and transmitted from, message source 220 described above with reference to FIG. 2A.

Header field modifier 282 may be operative to overwrite source-specific information in selected data packet header fields. As set forth in detail below, header field modifier 282 may generally replace selected information in packet header fields with the text-based data to be delivered to the caller ID system associated with the intended recipient of the message.

Message router 283 may be operative to route the modified data packet to one or more intended recipients, such as the caller ID feature of SIP enabled telephones 272A, 272B, or the IAD 260 described above. In an alternative embodiment, system 280 may incorporate the protocol translation functionality of IAD 260. For example, output from message router 283 may be directed to a protocol translator (not shown) prior to transmission to a recipient; similarly, output from header field modifier 282 may be directed to such a translator prior to delivery to message router 283.

Figure 3:
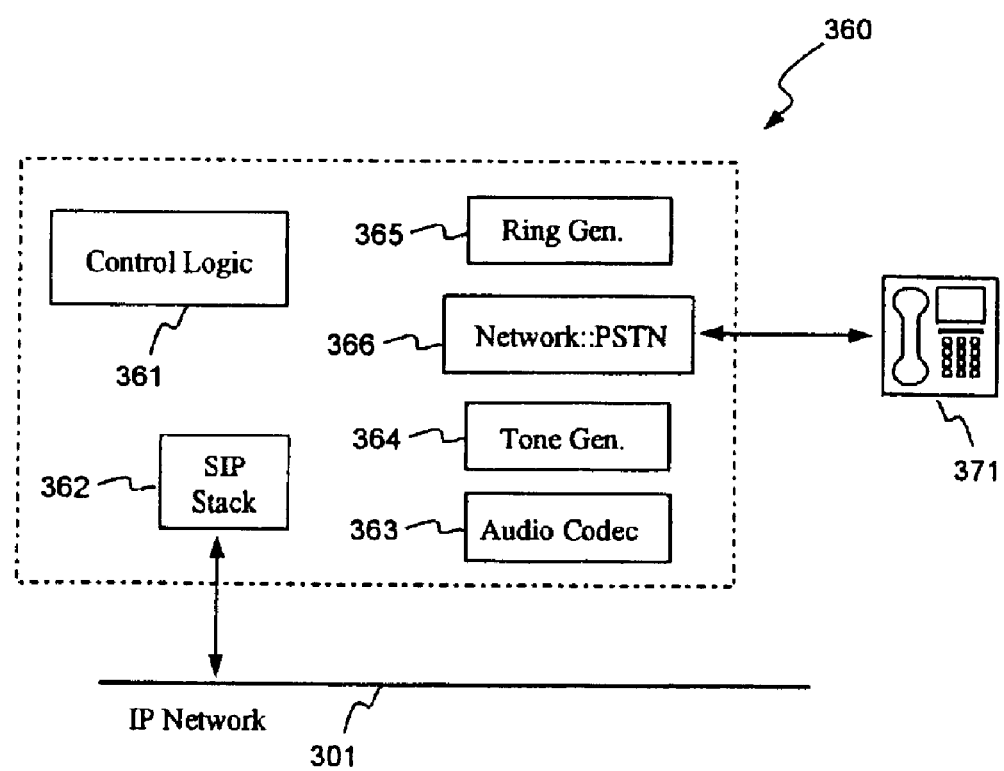
FIG. 3 is a simplified high-level block diagram illustrating components of one embodiment of an Integrated Access Device.

FIG. 3 is a simplified high-level block diagram illustrating components of one embodiment of an Integrated Access Device. As depicted in the FIG. 3 embodiment, IAD 360 may generally correspond to IAD 260 described above with reference to FIG. 2A, and may couple an IP network (represented by reference numeral 301) employing SIP to a PSTN device such as POTS telephone 371.

IAD 360 may be implemented in hardware, firmware, software, or a combination thereof, providing tones (such as dial tones, busy signals, ring indications, and the like) and ring current, respectively, through a tone generator 364 and a ring generator 365. An audio compressor/decompressor, codec 363, may compress and decompress audio signals using standardized compression schemes known in the art. Audio codec 363 may enable audio signals generated at POTS telephone 371 to be packetized for transmission through SIP Stack 362 and across an IP data network 301; similarly, codec 363 may enable data from network 301 (received at SIP Stack 362) to be de-packetized into a format recognized by POTS telephone 371.

Transmission of converted or translated data may be facilitated by an appropriate interface, such as Network::P-STN interface 366, where the "Network" side of interface 366 may function in accordance with the protocol employed by the particular network 301 to which IAD 360 is connected (SIP, in this example), and the "PSTN" side of interface 366 may communicate in accordance with a protocol recognized by POTS telephone 371. Control logic 361 may be embodied in hardware, firmware, software, or a combination thereof; control logic 361 may be operative to control the functionality of, and interaction between, the other hardware and software components incorporated into IAD 360. Additionally, control logic 361 may implement SIP Stack 362 and coordinate transmission and receipt of SIP messages.

Figure 4:
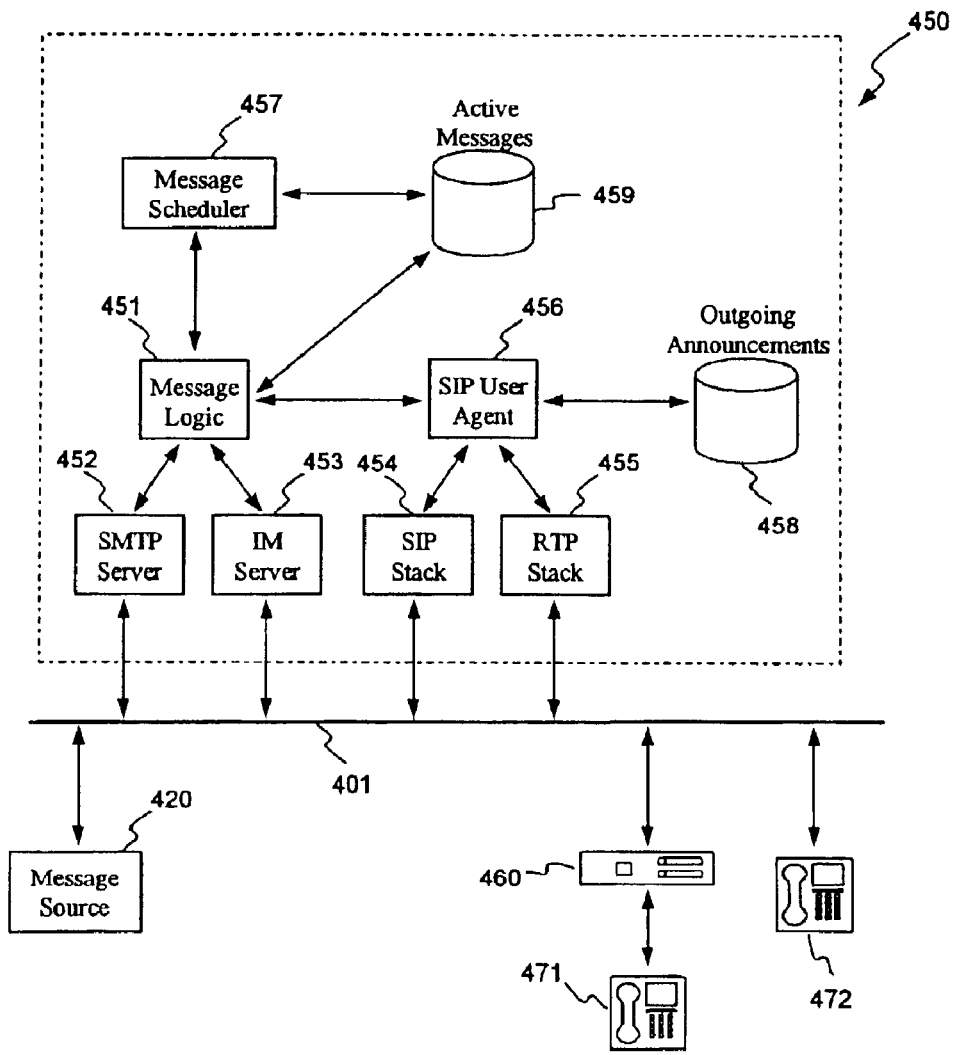
FIG. 4 is a simplified high-level block diagram illustrating components of one embodiment of a message server.

FIG. 4 is a simplified high-level block diagram illustrating components of one embodiment of a message server. In the FIG. 4 arrangement, a message server 450 may facilitate serving text-based data messages to the caller ID systems associated with POTS telephone 471 and SEP enabled telephone 472. Message source 420 may generally correspond to message source 220 described above with reference to FIG. 2A; message source 420 may be an e-mail client, for example, or an instant message (IM) client. As noted above, application program software at message source 420 may be employed to compose a message to be transmitted to one or more intended recipients such as telephones 474 and 472.

In accordance with the FIG. 4 embodiment, message server 450 may incorporate two incoming servers, namely: SMTP server 452 for receiving inbound messages from e-mail clients; and IM server 453 for receiving inbound messages from IM clients. The nature of the message source 420 (e-mail client or IM client), therefore, may determine which of SMTP server 452 or IM server 453 receives a message transmitted from source 420.

Upon receipt at either server 452 or 453, data packets may be forwarded to a message logic subsystem 451. Message logic 451 may determine if an incoming packet is a text message, or part thereof, to be queued for immediate processing, or a text reminder, or part thereof, to be archived for subsequent processing at a later time. By way of example, a reminder may be forwarded to a message scheduler 457, which may archive the reminder in an active messages database 459 or other data structure; the reminder may be retrieved by message logic 451 from database 459 as indicated in FIG. 4 for transmission at the appropriate time.

Messages to be delivered without archival may be forwarded by message logic 451 to a SIP user agent 456 for immediate transmission.

To facilitate transmission, user agent 456 may initiate a call to the intended recipient of the message. Where the network 401 is operative in accordance with SIP, for example, user agent 456 may employ the SIP stack 454 to transmit an INVITE request to the intended recipient such as SIP enabled telephone 472 or POTS telephone 471 (through IAD 460, which may correspond to IAD 360 described above). As noted above, some embodiments of a system and method of serving text-based data messages may overwrite certain fields in a data packet header; the message text may appear in an appropriate header location which is recognized by the receiving caller ID system. In the FIG. 4 arrangement, user agent 456 may substitute message text for the original contents of the "display name" or the "caller ID" fields in the "from" header, for example; additionally or alternatively, contents of the "subject" header may be replaced by message text.

A caller ID system at the intended recipient (one or both of telephones 471 and 472) may retrieve data from one or more header locations which ordinarily may contain source-specific identifying information. Since such identifying information has been replaced by text-based message data (at message source 420, message server 450, or both), the receiving caller ID system displays a message rather than information identifying the source of the call; in the foregoing manner, operation of a system and method of serving such text-based data messages may be transparent to the served caller ID system.

Additionally, message server 450 may be provided with outgoing audio capabilities; in such an embodiment, user agent 456 may transmit audio data, such as a pre-recorded announcement or other audio signal, for example, advising the intended recipient that an incoming call is a text-based message or reminder. Such pre-recorded audio data may be stored, for example, in a database or other storage medium 458, to be selectively retrieved and transmitted at appropriate times by user agent 456.

RTP stack 455 may generally operate in the same manner as the SIP stack 454 described above, and may be employed in the case where the network 401 is operative in accordance with RTP.

Figure 5:
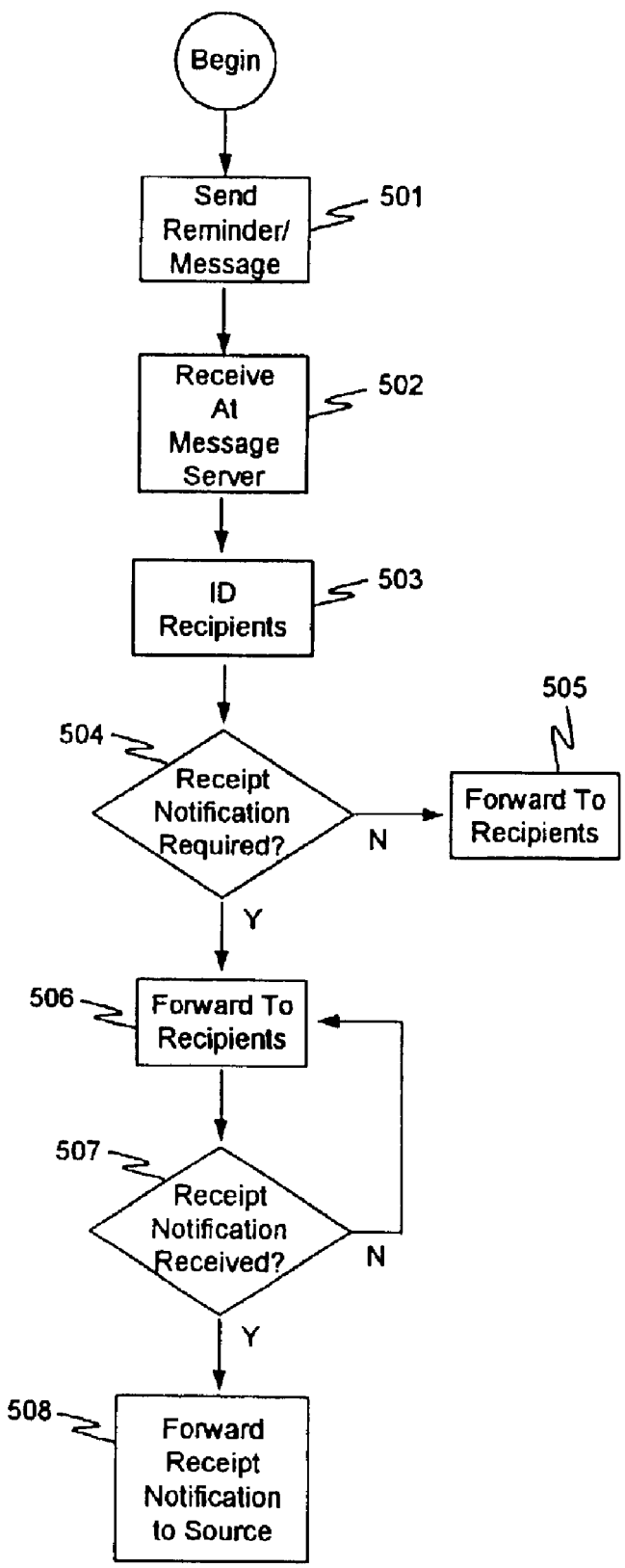
FIG. 5 is a simplified flow diagram illustrating the general operational flow of one embodiment of a method of serving text-based data messages to a caller identification system.

FIG. 5 is a simplified flow diagram illustrating the general operational flow of one embodiment of a method of serving text-based data messages to a caller identification system. As indicated at blocks 501 and 502, a message composed at a remote source and addressed to one or more intended recipients may be routed to a message server, which may receive and queue the message for processing as described above with reference to FIGS. 2A and 4. At block 503, the message server may identify the one or more intended recipients of the message such that the message or reminder may be routed properly.

Any existing source-specific or source-identifying data in a display name or caller ID field of a data packet header may be overwritten with a text-based message. Such selective insertion of text-based data into header fields of a data packet may occur when the message is originally created and transmitted (block 501), or in conjunction with parsing the data packet to identify intended recipients (block 503), for example.

A system and method of serving data messages may determine whether receipt notification is required or requested by the source at decision block 504. If no receipt notification is required or requested, the message may simply be forwarded to the identified intended recipients as indicated at block 505. Where receipt notification is either required or requested by the source, however, the data packets containing the message may be routed to the identified intended recipients as indicated at block 506.

In the FIG. 5 embodiment, a message server may repeatedly forward the message to the recipient, for example, until the recipient transmits a receipt notification which is received at the message server. In the case of multiple recipients, the message server may selectively forward the message to recipients from which a receipt has not been received. This iterative process is illustrated by the loop from decision block 507 back to block 506. Alternatively, when control logic at the message server does not receive a notification of receipt, the message server may archive the message in an active message database to be processed and retransmitted at a later time, for example.

As indicated at block 508, when receipt notification has been received, the message server may forward the receipt notification to the source as confirmation of a successful message delivery.

With respect to the FIG. 5 embodiment, those of skill in the art will appreciate that a protocol translator or converter device, such as an IAD described above with reference to FIGS. 2A and 3, may be identified as a recipient of the message. In operation, such a translator may serve as a sort of proxy for a POTS telephone, such that the telephone itself is not identified by the message server as an intended recipient, but rather the translator attends to any protocol translation and forwarding tasks.

The foregoing receipt notification may be in the form of a simple SIP message transmitted from the recipient to the message server. For example, when a SIP telephone begins ringing, a "180 Ringing" response is transmitted to the caller (in this case, the message server); when a recipient answers a ringing SIP telephone, a "200 OK" response is transmitted to the caller or message server. In either of the above examples, the message server control logic may interpret the Ringing or OK response as confirmation of message receipt. As an alternative, the recipient may initiate a call to the message server as receipt notification.

Several features and aspects of the present invention have been illustrated and described in detail with reference to particular embodiments by way of example only, and not by way of limitation. Those of skill in the art will appreciate that various modifications to the disclosed embodiments are within the scope and contemplation of the invention. Therefore, it is intended that the invention be considered as limited only by the scope of the appended claims.

What is claimed is:

1. A method of serving text-based data messages to a caller identification system in a telecommunications network; said method comprising:
    receiving a data packet comprising message data and a header field containing source-specific information identifying a source of said data packet;
    identifying one or more intended recipients of said data packet;
    overwriting said source-specific information in said header field with said message data; and
    forwarding said data packet to said one or more intended recipients in accordance with said identifying.

2. The method of claim 1 further comprising selectively translating said data packet into a protocol recognized by said one or more intended recipients, and wherein said forwarding is further in accordance with said translating.

3. The method of claim 1 further comprising:
    determining whether receipt notification has been requested by said source; and
    responsive to said determining, selectively repeating said forwarding.

4. The method of claim 1 wherein said receiving and said identifying include parsing at least part of said data packet.

5. The method of claim 1 further comprising displaying said message data on a caller identification system display associated with each of said one or more intended recipients.

6. The method of claim 1 wherein at least part of said telecommunications network is operative in accordance with Session Initiation Protocol.

7. A message system serving text-based data messages to a caller identification system in a telecommunications network; said message system comprising:
- a message receiver operative to receive a data packet comprising message data and a header field containing source-specific information identifying a source of said data packet;
- a header field modifier operative to overwrite said source-specific information in said header field with said message data; and
- a message router operative to route said data packet, modified by said header field modifier, to one or more intended recipients.

8. The message system of claim 7 wherein said message receiver, said header field modifier, and said message router are incorporated into a network access device.

9. The message system of claim 7 wherein said message receiver, said header field modifier, and said message router are incorporated into a computer server.

10. The message system of claim 7 further comprising a protocol translator operative to translate said data packet into a protocol recognized by said one or more intended recipients.

11. The message system of claim 10 wherein said protocol translator is an integrated access device.

12. The message system of claim 10 wherein said protocol translator allows Session Initiation Protocol data packets to be translated into a protocol recognized by a public-switched telephone network device.

13. A computer-readable medium encoded with data and computer executable instructions for serving text-based data messages to a caller identification system in a telecommunications network; the data and instructions causing an apparatus executing the instructions to:
- identify a data packet comprising message data and a header field containing source-specific information identifying a source of said data packet;
- create a modified data packet wherein said source-specific information in said header field is overwritten with said message data; and
- forward said modified data packet to one or more intended recipients.

14. The computer-readable medium of claim 13 further encoded with data and instructions, further causing said apparatus to translate said modified data packet into a protocol recognized by said one or more intended recipients.

15. The computer-readable medium of claim 13 further encoded with data and instructions, further causing said apparatus to:
- determine whether receipt notification has been requested by said source; and
- repetitively forward said modified data packet to selected ones of said one or more intended recipients until receipt notification from each of said one or more intended recipient is received by said apparatus.

16. The computer-readable medium of claim 15 further encoded with data and instructions, further causing said apparatus to transmit a receipt confirmation to said source.

17. A method of serving text-based data messages; said method comprising:
- providing a data packet comprising message data, a source header field containing source-specific information related to a source of said data packet, and a recipient header field containing recipient-specific information related to one or more intended recipients of said data packet;
- overwriting said source-specific information with said message data;
- creating a modified data packet in accordance with said overwriting; and
- forwarding said modified data packet in accordance with said recipient-specific information.

18. The method of claim 17 further comprising translating said modified data packet into a protocol recognized by said one or more intended recipients.

19. The method of claim 17 further comprising selectively repeating said forwarding to ones of said one or more intended recipients.

20. The method of claim 19 further comprising:
- determining whether each of said one or more intended recipients has received said modified data packet; and
- terminating said selectively repeating in accordance with said determining.

21. The method of claim 17 further comprising displaying said message data on a caller identification system display associated with each of said one or more intended recipients.

22. The method of claim 17 wherein at least part of said telecommunications network is operative in accordance with Session Initiation Protocol.

23. A communications network system comprising:
- a message source operative to compose and to transmit a data packet comprising message data and a header field containing source-specific information identifying said message source;
- one or more intended recipients operative to receive said data packet;
- each of said one or more intended recipients having an associated display for displaying information in said header field;
- a message processor operative to create a modified data packet wherein said source-specific information in said header field is overwritten with said message data; and
- a message router operative to route said modified data packet to said one or more intended recipients.

24. The network system of claim 23 wherein said message source, said message processor, and said message router are incorporated into a network access device.

25. The network system of claim 23 wherein said message source, said message processor, and said message router are incorporated into a computer server.

26. The network system of claim 23 further comprising a protocol translator operative to translate said modified data packet into a protocol recognized by said one or more intended recipients.

27. The message system of claim 26 wherein said protocol translator is an integrated access device.

28. The message system of claim 26 wherein said protocol translator allows Session Initiation Protocol data packets to be translated into a protocol recognized by a public-switched telephone network device.

* * * * *